United States Patent [19]

Dodd

[11] Patent Number: 4,476,526

[45] Date of Patent: Oct. 9, 1984

[54] CACHE BUFFERED MEMORY SUBSYSTEM

[75] Inventor: P. David Dodd, Boulder, Colo.

[73] Assignee: Storage Technology Corporation, Louisville, Colo.

[21] Appl. No.: 325,346

[22] Filed: Nov. 27, 1981

[51] Int. Cl.³ .............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,566,358 | 2/1971 | Hasbrouck | 364/200 |
| 3,735,360 | 5/1973 | Anderson et al. | 364/200 |
| 4,075,686 | 2/1978 | Calle et al. | 364/200 |
| 4,096,567 | 6/1978 | Millard et al. | 364/200 |
| 4,161,024 | 7/1979 | Joyce et al. | 364/200 |
| 4,228,496 | 10/1980 | Katzman et al. | 364/200 |
| 4,228,503 | 10/1980 | Waite et al. | 364/200 |
| 4,271,519 | 6/1981 | Hall | 371/38 |
| 4,277,844 | 7/1981 | Hancock et al. | 371/38 |

OTHER PUBLICATIONS

"Storage Attachment Architecture" by P. David Dodd; May, 1980; Storage Technology Corporation.

IBM Corporation, "IBM 3880 Storage Control Model 11 and Model 13"; Oct. 21, 1981.
IBM Tech. Discl. Bull., vol. 15, No. 11, Apr. 1973, pp. 3463-3464, "Attached Support Processor W/Shared Cache and Execution Unit" by Schmookler.

Primary Examiner—Jerry Smith
Assistant Examiner—William G. Niessen
Attorney, Agent, or Firm—Woodcock Washburn Kurtz Mackiewicz & Norris

[57] ABSTRACT

A buffered cache memory subsystem is disclosed which features a solid-state cache memory connected to a storage director which interfaces a host channel with a control module controlling operation of a long-term data storage device such as a disk drive. The solid-state cache memory is connected to plural directors which in turn may be connected to differing types of control modules, whereby the cache is usable with more than one type of long-term data storage means within a given system. The cache memory may be field-installed in a preexisting disk drive storage system and is software transparent to the host computer, while providing improvements in overall operating efficiency. In a preferred embodiment, data is only cached when it is expected to be the subject of a future host request.

14 Claims, 6 Drawing Figures

CACHE BUFFERED MEMORY SUBSYSTEM

FIELD OF THE INVENTION

This invention relates to memory subsystems for the storage of data in data processing systems. More particularly, the invention relates to an improvement in memory subsystems used in data processing systems whereby the overall throughput or utility of the data processing system is improved.

BACKGROUND AND OBJECTS OF THE INVENTION

Improvements in data processing systems have generally been directed at improvement either of the average time required to execute a given instruction or reduction in cost of the equipment required to perform such an instruction. One design tradeoff which has typically been made is that of performance versus price for units of memory for the storage of data. For example, tape memory is traditionally slower and less expensive than disk memory. Disk memory in turn is available in several types; the selection of any one type involves a performance/price tradeoff. Disk memory is slower but less expensive than solid-state memory which itself is available in several types, the selection of which again involves a performance/price tradeoff. Thus, it continues to be a need of the art to provide cheaper, faster memories or, failing that, to improve the efficiency of presently existing memory types. The present invention relates to an improvement of the second type. In particular, the invention involves apparatus and methods of operation thereof for reducing the average time necessary for a host central processing unit (CPU), which typically comprises an arithmetic and logic unit and a main memory unit for retention of the instructions and data currently being operated on, to obtain data stored on a less expensive long-term data storage device, such as a magnetic disk or tape drive unit.

Delays in memory access occur due to mechanical limitations of the apparatus. For example, in the case of a disk drive, in general, plural disks rotate at a fixed speed past read/write heads which may either be stationary with respect to the disk or move radially back and forth with respect to the disk in order to juxtapose the heads to various portions of the disk surfaces. In either case, there is a finite average time (termed "access time") required for a particular data record to be located and read from the disk into a faster form of memory, typically a solid state main memory included in the host computer. The delay may involve the "seek" time required for the head to be moved radially to the particular "track" selected, as well as "latency" time required for the disk to rotate with respect to the head until the beginning of the particular record sought is juxtaposed to the head for reading or writing.

Accordingly, it is an object of the present invention to provide a memory subsystem in which the average time required for a record sought to be transferred to the main memory system of a host computer is significantly reduced.

Prior art data processing systems typically comprise a host computer and long term memory storage means including such devices as magnetic disk memory units and magnetic tape units. Communication from the host computer to the disk or tape memory subsystem is generally made via a "channel" which physically comprises a defined set of signal connections over which all information—including data as well as commands, control signals, status signals, request signals and the like—must pass. In order that a memory subsystem can be marketable, it must "interface" or mate directly with a channel identical with those with which prior memory subsystem mated, thus being "plug compatible" with the host computer.

It is an object of the present invention to provide an improved memory subsystem which is "plug-compatible" with a prior art host computer.

Similarly, it is desirable if not commercially requisite that any data subsystem not require modification to the host programming instructions or "software" upon connection, i.e., that it be "software-transparent" to the host.

It is an object of the present invention to provide a memory system which provides improved performance as noted above, while being software transparent to the host.

In order that a memory subsystem can be software transparent to the host, it is necessary that it support its own error recovery and data management functions without intervention of the host computer or its operators or programmers.

It is an object of the invention to provide a memory subsystem with its own data storage and management and error recovery functions, such that the operator and/or programmers of the host computer need not even be aware of the memory system's existence.

During typical operation of a data processing system according to the prior art, a host computer reaches a point in a program at which it requires additional data to be fetched from a long-term storage device and brought into main memory. At this point, a "read" command is generated and passed over the channel to the memory subsystem. Similarly, at some point a host computer may desire to write data generated during processing to a long-term memory subsystem; accordingly, a "write" command would be generated and passed over the channel to the memory subsystem. These read and write commands generally may be referred to as system input/output commands or "SIOs". As noted above, the typical long-term memory storage means requires some appreciable time before any given read or write command can be executed due to the latency time inherent in the mechanical system. Further, communication paths between the host computer and the device must be free in order to start the SIO operation. So that the host is not idled during latency, it moves on to another task, while a "queue" of SIOs is generated, if the required communication path is busy. The SIO's are thereafter satisfied by the memory system as soon as communications paths become available. This operation is typically performed under control of one or more "storage director units" which for example in the case of disk drives may control up to eight individual rotating spindles each of which may carry up to 10 magnetic disks, each accessible on either side by 20 read/write heads. It will be appreciated by those skilled in the art that a queue may have a large number of SIO requests waiting at any given time, and that such lengthy queues involve substantial system complexity, for which price and performance penalties must be paid.

It is an object of the invention to reduce the length of such queues to further increase system utilization and performance.

Similarly, when the data subsystem is ready to perform the read or write operation requested, the required communications paths may not be available, since the above mentioned seek and latency operations are actually performed disconnected from the host computer. Accordingly, the desired data which is at a fixed position on the continually rotating surfaces will pass by the head untransferred, requiring an additional full rotation before the next reconnect try. This is termed "RPS miss" time and greatly adds to the delay in processing the required data.

It is again an object of the present invention to reduce this "RPS miss" time.

Systems have been offered for sale in the prior art which purport to solve the problems listed above. For example, Memorex Corporation has offered for sale a device, known as the Model 3770 Disk Cache System, which is to be attached to a single storage director controlling the operation of a number of disk drives. When a "read" request is received from a host computer, the 3770 cache system reads the data from the disk into a solid-state memory and thereafter makes it available to the host. This system has the possibility of saving a certain amount of RPS miss time. However, the 3770 system has certain design defects which are overcome by the present invention. For example, the 3770 system attaches to a single "control module" which consists of specialized electronics that operate under a director and control one to eight drives of a single type. This is undesirable, as many existing data processing systems contain plural types of disk drives, so that it would be desirable to provide a cache memory system which has the capability of improving the performance of all these types of disk drives within a single embodiment.

It is accordingly an object of the invention to provide a cache memory system which is adapted to be connected to a plurality of disk drive types.

Another disadvantage of the 3770 design is caused by the fact that it is connected "beneath" a single director in the data system organization, i.e., on the other side of the director from the CPU. Accordingly, the hardware and software required to implement the cache is bound to a relatively few drives (8 or less). Since a director can control up to 64 drives in a typical embodiment, multiple cache devices must be used in order to provide caching capability to all the drives. Some number of these caches will be idle at any one time, while others are busy. The overall hardware utilization can thus be quite low with this system, and the expense quite high due to the multiple copies of hardware that must be provided to support all drives.

It is an object of the present invention to provide a cache memory system which can be connected to plural directors thus rendering it capable of improving the efficiency of processing several read/write instructions simultaneously, to any of the disk drives connected to the director and in which the cache resources are allocated dynamically to the active drives as required.

New drive interconnection systems have been developed to improve path availability. One such system is termed "dual port" in the industry and provides two alternative connection paths for each device. This system cannot be accommodated by the Memorex system. Such accommodation is an object of the present invention.

Other aspects and objects of the invention will appear to those skilled in the art as the discussion below proceeds. In particular, the requirement of software transparency of the cache memory subsystem of the invention to the host requires, inter alia, that means be provided whereby the cache memory subsystem can be removed from the ordinary data flow if any error occurs in it. Furthermore, the requirement that the cache memory subsystem of the invention be useful with a plurality of differing types of disk drives within a particular embodiment requires that data records of varying predetermined sizes be efficiently accommodated within the cache memory system.

SUMMARY OF THE INVENTION

The above needs of the art and objects of the invention are satisfied by the present invention which comprises a solid state cache memory unit which comprises random access memory storage devices and a cache memory controller unit. The cache memory unit is operatively connected to disk or other long-term memory storage directors such that several directors can simultaneously direct data to and read data from the cache. The directors in turn are connected by individual channels to host computers. Further, the cache memory of the invention may be connected to disk drives of the dual port type in which plural directors can access a single string of disk drives so that plural tasks can be performed simultaneously on the same string of disk drives. Provision of cache memory space management functions in the cache memory subsystem rather than in the host allows the host to be freed from data storage management (as compared to certain prior art expedients discussed below), while permitting the cache manager to be adaptable for use with differing types of disk drives, in differing system arrangements and permitting of future enhancement. In a preferred embodiment, means are provided for detection of sequential data so that no performance loss is encountered by useless caching of randomly accessed data sets. Similarly, in a preferred embodiment, means are provided for varying the relative size of subdivisions of the cache memory space to match the length of the records most frequently accessed, so as to provide more efficient use of the cache memory area.

BRIEF DESCRIPTION OF THE DRAWINGS

The invention will be better understood if reference is made to the accompanying drawings, in which.

DESCRIPTION OF THE PREFERRED EMBODIMENTS

As discussed above, the cache buffer memory subsystem of the present invention is designed to operate in accordance with a prior art host computer in such a manner that no modification of the host's hardware or software is required. In particular, the cache buffer memory subsystem of the invention should attach to the host computer through a conventional memory channel without modification; that is, it should be plug-compatible with, and software-transparent to, the host. In a preferred embodiment, the cache memory subsystem of the invention is designed to operate in accordance with an IBM Corporation computer (or other computer plug-compatible with the IBM unit) of the class in which the channel is defined by IBM Publication GA22-6974-4 entitled "I/O Interface Channel to Control Unit". This volume describes the channel specifications for plug-compatible memory systems. In a particularly preferred embodiment, the cache buffered memory subsystem of the invention is comprised in a disk drive memory system of the type previously sold by the assignee of the present invention configured to include a solid-state random access memory (RAM) which can physically be included within the enclosure containing the disk drive storage director unit. Indeed, the addition of the cache feature of the present invention may be made in such a manner as to be field-installable on previously shipped customer units at minimal additional complexity and cost, while substantial performance improvements may be realized.

Figure 1:
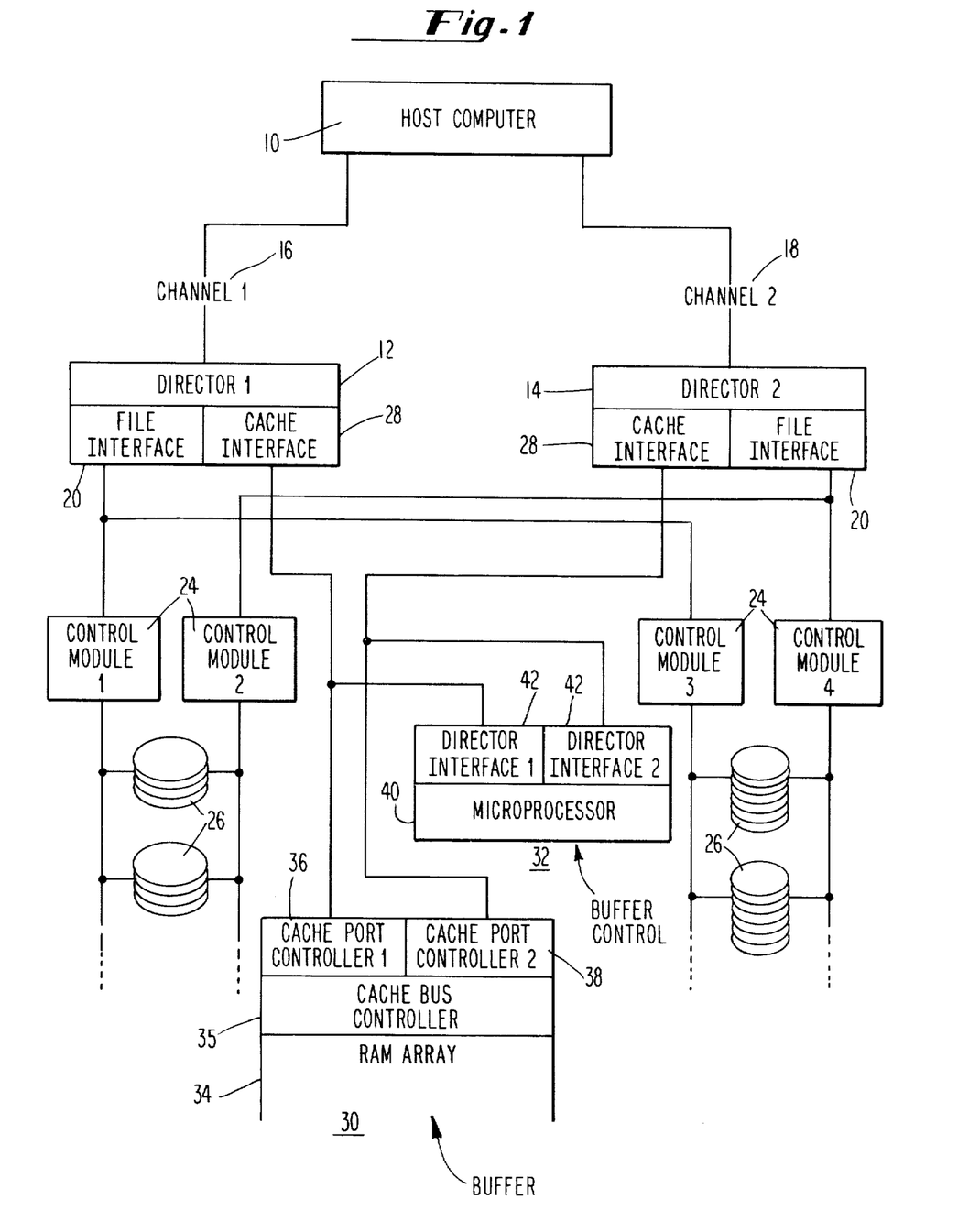
FIG. 1 shows a schematic overview of the system of the invention.

Referring now to FIG. 1, an overall view of a data processing system comprising a host computer system as defined above and a cache buffered memory subsystem is shown. The host computer 10 is connected to pair of storage directors 12 and 14 through channels 16 and 18, respectively. The directors and channels can be multiplied further, as well known in the art. Each director comprises a file interface 20 through which data is passed, via control modules indicated generally at 24, and thence to disk drive units indicated generally at 26. As indicated schematically in the drawing, the disk drives 26 may be of various types. The control modules 24 to which the disk drives 26 are connected serve to interface varying types of disk drives with directors 12 and 14 such that plural types of disk drives 26 together with appropriate control modules 24 can be used in conjunction with identical (though in some cases "personalized" by software) directors. As described thus far, the system of FIG. 1 is conventional. According to the present invention, the directors 12 and 14 are modified to additionally comprise cache interface units 28 which serve to interface the directors with a cache buffer memory subsystem according to the invention, which as schematically shown comprises a buffer unit 30 and a buffer control unit 32. The buffer unit 30 has as its chief function the storage of data having been "staged" in anticipation of being required by the host computer. When the staged data is called for it can be very quickly read out of a solid-state random access memory (RAM) array 34, the heart of the buffer unit, through one of a plurality of cache port controllers 36 and 38, respectively communicating with the directors 12 and 14, and thence to the host. This is generally a considerably faster process than reading the data directly from a disk drive unit 26 as there is no seek and latency time involved in the use of the random access memory 34, as there is in the case of the disk memories 26.

It will be apparent to those skilled in the art that data which is sequential in nature, i.e., in which successive parts of the same data file are sequentially called for by the host, are those which can most usefully be staged to the cache in advance of actually being called for by the host. However, in the preferred embodiment of the invention designed to operate in conjunction with the IBM system referred to above, no distinguishing mark from which it can be determined that a particular record sought is in fact part of a sequence of such records is found in the data stored on the disk storage device 26. Nor is any mark provided as part of the signal provided by the host when calling for a particular record. Indeed, it is not possible to determine from any indication provided in this system that a particular record is sequential or that it is the only one from, for example, a particular disk storage device to be called for during processing of a given program. However, it is important to the utility of the cache memory of the invention that some means be provided for distinguishing between sequential and randomly accessed data records. As there is inevitably some additional complexity involved with the cache system, if a distinction is not drawn successfully between sequential and randomly accessed data records, the access time experienced with respect to the randomly accessed data at least will suffer by virtue of the additional complexity. Accordingly, a microprocessor 40 in the buffer control unit, or manager, 32 is used to examine all records actually accessed by the host in order to determine which records are sequential, i.e., to identify and to signal those situations in which the following or surrounding record(s) are likely to be called for by the host, whereupon one or more of the succeeding records are then staged to the RAM array 34 to await the host's next requirement. In a preferred embodiment, staging is performed on disk track-by-track. The microprocessor 40 communicates with the directors 12 and 14 via director interfaces 42 and directs the flow of data from the disk drives 26 through the directors 12 and 14 and into the RAM cache 30. The details of the method by which the microprocessor 40 determines which data records are likely, to be sequential are the subject of copending application entitled "Detection of Sequential Data Stream" of Dodd et al Ser. No. 325,350 filed Nov. 27, 1981, incorporated herein by reference.

It will be appreciated that it would probably be possible to modify the software of the host computer's operating system and/or its channel to provide a signal to the peripheral storage apparatus indicating that only a portion of a particular data set is being called for at a given time. Such a signal could be used to control the operation of a cache for staging of successive data records. However, this would not fulfill the object of the invention mentioned above, in particular that the host and its software must remain unchanged, while permitting addition of a cache memory system according to the invention. That is, such a modified host would no longer be "software transparent".

Furthermore, it will also be appreciated by those skilled in the art that there are host operating systems which read more than one sequentially accessed data block into the host's main memory at a time. Such a system is available from IBM and is referred to as "Sequentially Accessed Memory—Extended" or "SAM-E". While this system is not without utility it consumes a great deal of the main memory space for storage of the additional records, produces long data-transfer times on the channel which block other SIO's from being stored in a timely fashion, and can lead to inefficiencies in operation.

The present invention is also to a certain degree related to the subject matter of two commonly assigned applications, Ser. Nos. 85,909 filed Oct. 18, 1979 and 261,951 filed May 8, 1981, both in the name of Barry B. White. These applications relate to a virtual storage system in which data is written from a host computer onto a storage system without direction from the host as to what sort of long-term storage device is to contain the data, nor where on these devices it is to be contained. The invention of White differs from the present invention in that it requires substantial operating intelligence to perform these data storage functions. While the host is thus relieved of this task, in a preferred embodiment the host must be modified to permit this to be performed and hence the system of White is not software transparent to the host. Furthermore, the White invention is configured as a stand-alone unit of substantial complexity requiring an auxiliary CPU, whereas the cache memory system of the present invention is a relatively inexpensive add-on to preexisting disk storage systems, whereby their efficiency can be improved without substantial additional cost.

Another way in which plug compatibility affects the architecture of the cache memory subsystem of the invention is that according to IBM protocol, data is stored on disk in records of varying length, each record comprising a header including count and key fields, and followed by a data field. This is in contradiction to the practices of other computer system designs, wherein "fixed-block" architecture, i.e., architecture in which all data records are of the same length, is used. This distinction becomes extremely important in the design of a cache memory subsystem inasmuch as it is important to the efficient utilization of the random access memory used to make up the cache that the data records "fit" efficiently into the cache, i.e., without wasting expensive memory space. According to the preferred embodiment of the present invention this is done by dividing the cache memory into subportions termed "domains", the size of which are chosen to be common multipliers of the most frequently used record or track sizes. The designation of a particular domain of the cache memory as dedicated to records or tracks of a particular type may be varied dependent upon the amount of use that domain receives in a given period of time. The means by which this repartitioning of the cache is performed is the subject of copending application entitled "Adaptive Domain Partitioning of Cache Memory Space" of Coulson et al Ser. No. 325,351 filed Nov. 27, 1981, incorporated herein by reference.

Figure 2:
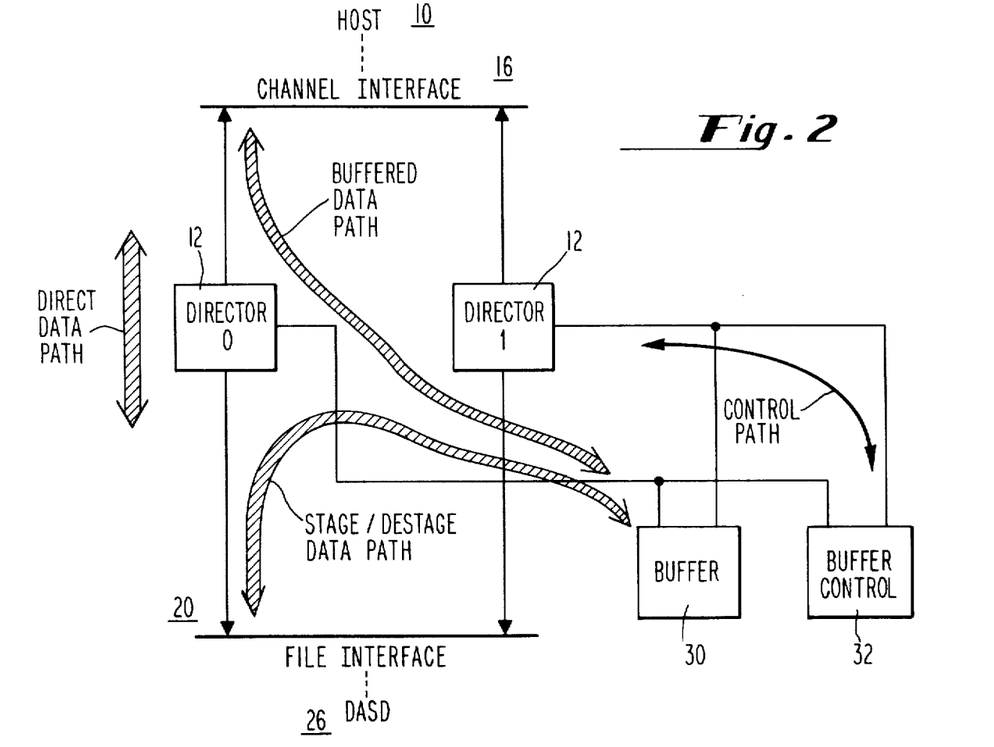
FIG. 2 shows the data and control paths in a simplified view of the system of the invention.

Referring now to FIG. 2 a schematic view is shown of the data flow between the file interface and the host interface in the cache buffered memory subsystem according to the invention. The typical prior art data path, directly from the channel interface 16 through a director 12, and via a file interface 20 to a disk drive 26, sometimes termed "DASD" for "direct access storage device", is shown. This data path is preserved according to the invention and is used as will be discussed below for all read operations when there is an error in the cache buffer, for the first of a detected sequence of read operations, and during ordinary write operations. In a staged read operation according to the invention, however, data is read from DASD 26, passes from the file interface 20 through the director 12 and thence to the data buffer 30 as directed by the buffer control unit 32. When the host 10 then calls for the data actually to be supplied to it, the location of the data is determined by buffer control unit 32, and this location is passed to the director 12, which controls the data flow out of the buffer 30 through the director 12 and through the channel interface 16 to the host 10. It will be appreciated that parallel connection is provided between the two directors, the channels, the buffer and the file interface unit. That is to say data may pass from a first director 12 from the buffer 30 enroute to the channel interface 16 after having been passed from DASD 26 to buffer 30 for staging by a second director 12. Paralleling of directors also permits data to move from the cache to the host even if the director used to stage data into the cache buffer then takes up another task before the data is actually called for by the host 10.

In this connection, it will be appreciated that the present IBM channel design provides a sequence of commands e.g., before an actual readout operation takes place. Typically, the host will issue a "Start I/O" command to the channel. The channel then will issue a series of commands, called seek and set sector, to the director which will then cause the disk drive's head moving apparatus to access the proper track of the disk and to look for a particular portion of that track. When this has been done a signal is passed back to the host indicating that the head is in position. A search command with search parameters is then issued by the host and the director then examines the count and key data fields for that containing the record of interest; when it is juxtaposed to the read/write head, the record is read via the director to the host's main memory for processing. According to the present invention, the same practice is followed upon receiving of a first read command. However, the data is further examined for indications that the successive record is likely also to be called for by the host. If so, the buffer controller 32 then causes the director to have the succeeding record or records brought into the cache buffer 30 so that subsequent read commands for successive records can more quickly be complied with. As noted above, the determination of which records show signs of being the first of a sequence of records to be called for by the host is the subject of copending application entitled "Detection of Sequential Data Stream" of Dodd et al. Ser. No. 325,350 filed Nov. 27, 1981. The broad concept of that disclosure will be discussed below. In a particularly preferred embodiment, data is staged from the disk into the buffer an entire track or multiples of a track at a time. Such disk tracks typically may comprise up to on the order of 100 records, i.e., blocks of data separated from one another by gaps and identified by index marks and the like. The 100 records may in turn be part of a disk file which may occupy many tracks, or in the case of large data files, up to several complete disk units.

As noted above, it is desirable that the cache buffered memory subsystem be a field installable modification to a preexisting product thus adding minor additional cost and complexity to a memory subsystem while permitting substantial performance advantages.

Figure 3:
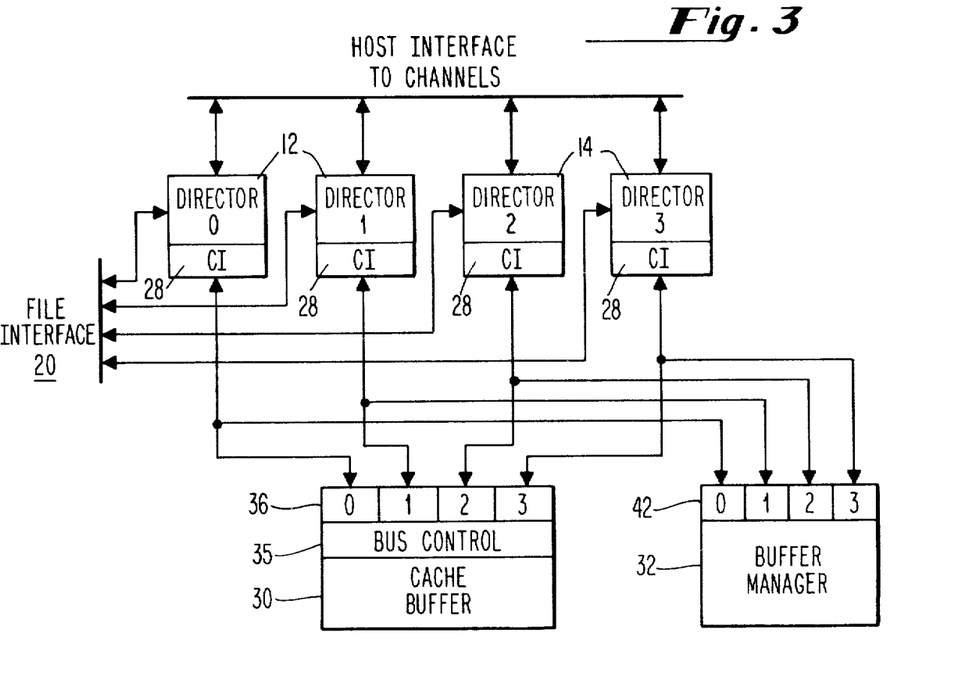
FIG. 3 shows expansion of the basic two director version to multiple directors, the file interface unit, and the cache buffer and manager units.

FIG. 3 shows one way in which the cache buffer feature of the invention can be added to a preexisting product while satisfying these conditions. FIG. 3 shows four directors 12 and 14 each connected to a host interface via a channel. As in the prior art the directors 12 and 14 are each connected to the control modules by way of the file interface which use the director commands to convert the data stream to one suitable for writing onto a particular type of disk and vice versa. Thus, the control modules are hardware personalized in accord with the type of disk storage media to which they are to be connected, while the directors are personalized to the disk type by microcode, and the hardware is the same regardless of the type of disks used. Such directors and control modules may be as presently found in commercial products of the assignee, for example in the Storage Technology Corporation Model 8880 disk controller. According to the present invention, to each director 12, 14 is added a cache interface unit 28 which is connected to an interface 36 and a bus control line 35 of the cache buffer unit 30. Control lines are also connected to the cache interface lines which run to the buffer interfaces 42 of the buffer manager 32. Thus, to the preexisting STC 8880 unit one need only add cache interface cards to the directors, and install the cache buffer and buffer manager units. Such an installation can be made to preexisting units in the field within a reasonable period of time and at reasonably modest additional cost.

It will be appreciated from inspection of FIG. 3 that the cache buffer 30 is connected in parallel to each of the directors 44 as is the buffer manager which controls flow of data between the directors and the cache buffer. This is in distinction to the Model 3770 cache arrangement proposed by Memorex Corporation discussed above in which a single cache per each control module is interposed between the control module and the director. This arrangement has several disadvantages; one of the prime disadvantages is that more caches are required. While for a given performance level such single control module caches can be made somewhat smaller, they are then less likely to be fully utilized. Moreover, when configured in the dual-port fashion of FIG. 1, provision of a separate cache for each control module does not allow two or more directors to access data having been staged in a given cache. This alternate path access is very desirable in a highly active system to avoid path busy conditions as previously discussed. Such versatility is made possible by the arrangement of the invention as illustrated in FIG. 3.

Figure 4:
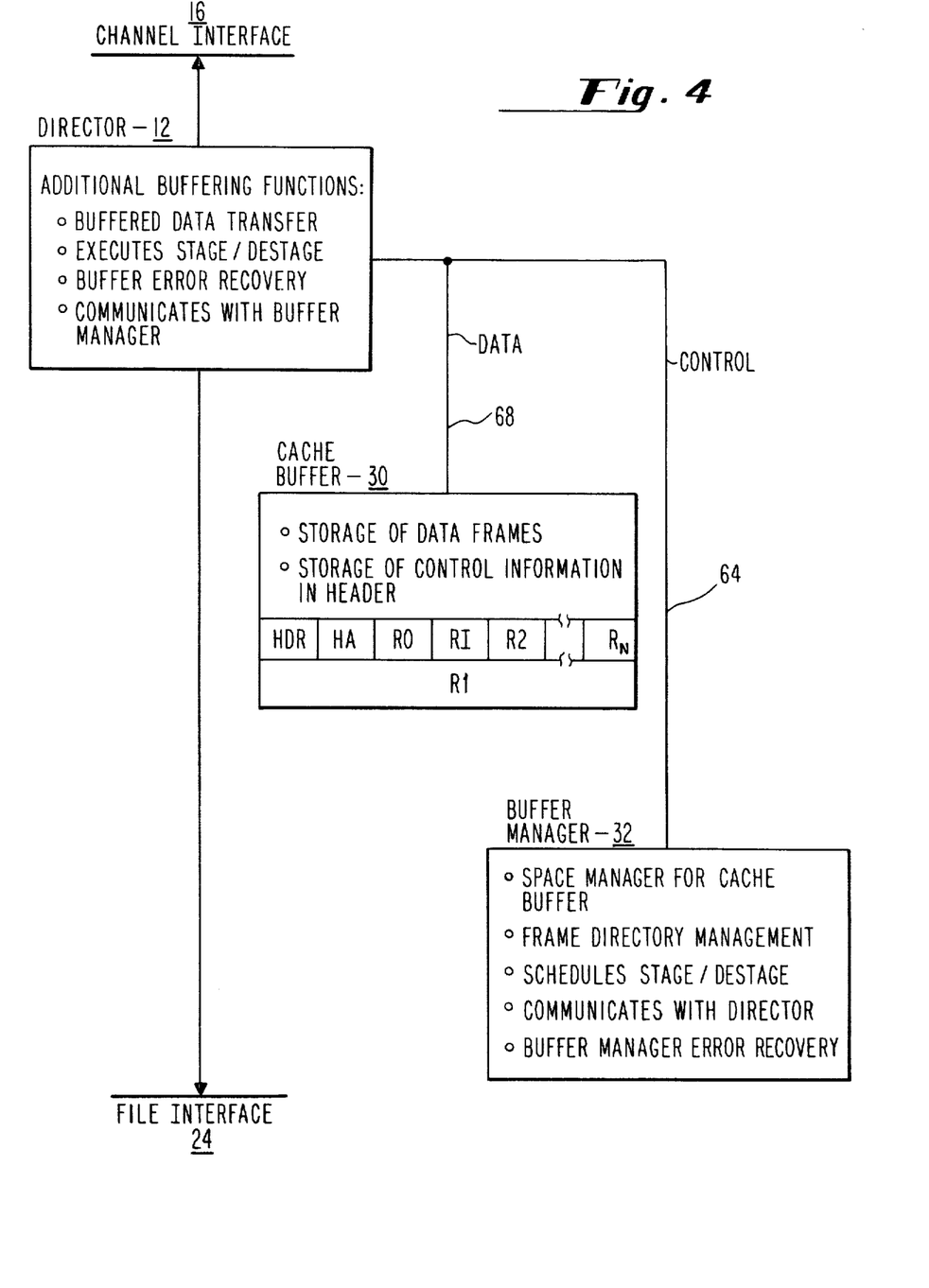
FIG. 4 shows a functionally partitioned view of the system of the invention showing which functions of the buffered cache memory device of the invention are performed by the subportions thereof.

FIG. 4 shows the functional partition of the cache buffered memory subsystem of the invention; that is, FIG. 4 illustrates the division of data management tasks between the various components making up the system of the invention.

As discussed above, in a preferred embodiment of the invention, it is configured as an add-on subsystem to a previously existing product, namely the model 8880 disk controller manufactured by the assignee of the present invention, Storage Technology Corporation. In this embodiment, the director 12 performs the functions of the director in the Model 8880; that is, it directs and interfaces to the control module which demultiplex the data to serial form thus directly interfacing the drives themselves, to the host channels thus converting the data from the form in which it is stored on disk to one to which the channel can respond. The director according to the invention performs the additional buffering functions of buffered data transfer, and execution of the stage and destage operations, i.e., writing of data from the disk via the control module into the cache buffer 30. The director also provides buffer error recovery systems, which amount to bypassing of the buffer in favor of direct transfer of data from the disk to channel interface, and the director communicates with the buffer manager. That is to say, the director performs switching functions, controlling the flow of data between the file interface to which is connected the control module and thence the disk units, the cache buffer 30, and the channel interface to which is connected the host computer. These switching functions are controlled in accordance with instructions received over a control interface 64 from the buffer manager 32. Thus, in the preferred embodiment in which the memory subsystem of the invention is added onto a preexisting STC 8880 product, the buffer manager control interface 64, the cache buffer 30, and the data interface 68 are added, while the director 12 is controlled to switch the data path in accordance with the instructions of the buffer manager 32.

As noted above, the buffer manager 32 determines whether a particular data record or series of records is likely to be called for by the host and accordingly decides whether or not to "stage" it into the buffer 30 in advance of its actually being called for by the host in order to save access time. The specific decision-making process performed by the buffer manager 32 in making this determination is the subject of copending application entitled "Detection of Sequential Data Stream" of Dodd et al Ser. No. 325,350 filed Nov. 27, 1981. Broadly, the decision involves examining the actual data to look for track jump orders, end-of-file indicators, write indicators and the like, events unlikely to be encountered as parts of sequential data sets.

FIG. 4 also shows the cache buffer 30 itself which performs the function of storing the data, which is preferably organized by frames. In a preferred embodiment, the cache is subdivided into "domains" of a fixed size chosen such that the individual frames which correspond to logical tracks on disk fit as closely to integrally as possible within the domains. This cache space organization scheme is the subject of copending application, entitled "Adaptive Domain Partitioning of Cache Memory Space" of Coulson et al. Ser. No. 325,351 filed Nov. 27, 1981 incorporated herein by reference. The cache buffer 30 also stores the control information or header which defines each individual variable length logical frame by count, key and data fields as noted above.

The buffer manager 32 in the preferred embodiment would comprise a microprocessor means, for example a Zilog Z8000 unit, and performs the management functions as follows. The chief function of the buffer manager is to manage the space of the cache, that is, to direct the storage of data within the cache memory and to retain the locations at which the specific records are stored in a "frame directory". The buffer manager similarly schedules stage and destage operations and communicates its instructions to the director 12. The buffer manager also performs error management and recovery functions, which may include controlling a mode switch to effect transferring of data directly between the disk and the channel interface in the case of a catastrophic error, which is the subject of copending application entitled "Data Path Reconfiguration for Error Control" of Blickenstaff et al Ser. No. 325,287 filed Nov. 27, 1981, incorporated herein by reference, in addition to parity-based error correction systems, as disclosed for example in commonly assigned U.S. Pat. No. 4,277,844 to Hancock et al.

Those skilled in the art will recognize that the buffer manager 66 must have as an essential function a method for correlating the beginning of a quantity of data staged in the cache from disk with its actual location on disk, so that instructions received by the director from the host—which are supplied in terms of location of the data on the disk—can be properly applied to the data stored in the cache. In a preferred embodiment, the data is staged to the cache in minimum quantities of at least one disk track, so that it is necessary to relate the address in the cache of the beginning of the block of staged data to the beginning of the track on the disk, which is typically marked on the disk by a permanent magnetic index mark made on each disk surface. In a preferred embodiment of the present invention this correlation is performed by noting the starting point of the stage data-transfer process, counting bits of data from zero as received, and noting the count at the time the index mark is received. This count indicates the relative locations of the starting point and index mark. Thereafter, a second count can be initiated. When this count is equal to the original starting point, a full data track has been read. This is the subject matter of co-pending application entitled, "Control of Cache Buffer for Memory Subsystem" of Moreno et al Ser. No. 325,288 filed Nov. 27, 1981, incorporated herein by reference. That application additionally contains detailed information as to the header format used in the cache frames, and explains how the buffer manager can determine that a full disk track has been read.

Figure 5:
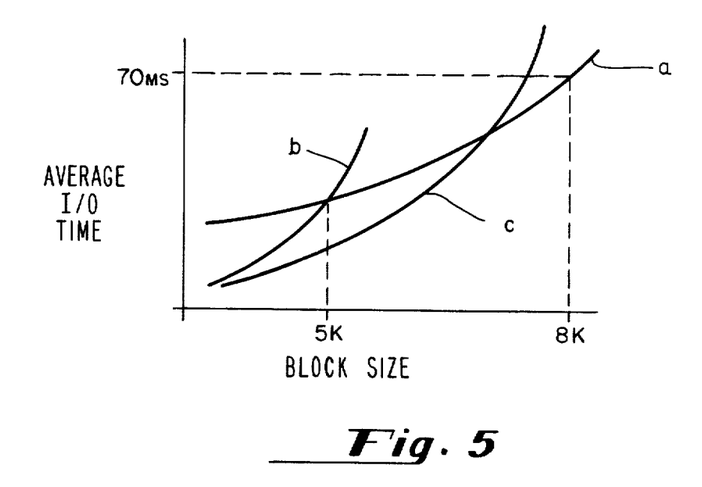
FIG. 5 shows a graph of the simulated performance of the system of the invention as a function of data block size.
Figure 6:
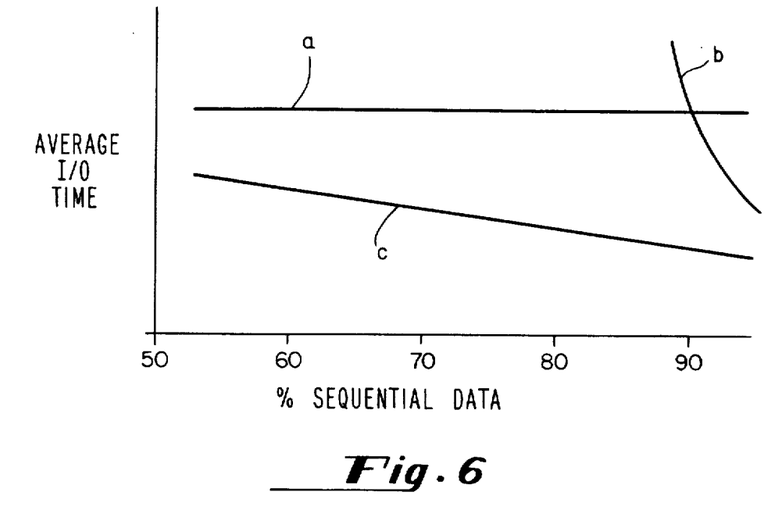
FIG. 6 shows a graph depicting simulated performance of the system of the invention as a function of the percentage of sequential data being accessed at a given time.

FIGS. 5 and 6 show graphically the performance improvements provided by the cache drive of the invention. These Figures represent data generated by computer simulation of system performance. No actual data is available as of the date of filing of the instant application. These results relate to a preferred embodiment in which data is called in units of disk tracks, which are conceptually defined to contain on the order of 10–12 records.

FIG. 5 shows average input/output command response time versus the block size of the data being accessed. As discussed above, input/output time includes in large portion the latency time required for a particular portion of the disk to be accessed to be juxtaposed to the read/write head in addition to the time required for the read/write head to move radially with respect to the disk (in those disk drives where movable heads are used) in addition to time lost due to components of the I/O path not being available at the time the data is available. While seek and latency delays are independent of the block size, since the longer block requires more time to be written or read, input/output transfer time and RPS miss time both increase as the block size increases. Curve A of FIG. 5 shows this, graphically representing the average response time of a prior art system, i.e., one in which no cache is present. There the longer the block the longer the average response time. The minimum time reached for the block is non-zero indicating that some average latency and access time is required even for a block of extremely short size.

Curve B of FIG. 5 shows the improvement made by caching a larger portion of data than that requested upon receipt of all input/output requests; that is, no distinction is drawn between those requests deemed likely to be sequential and those which are random. Clearly the input/output time as to the smaller block sizes is improved with respect to curve A as the latency time is substantially reduced or eliminated. However, the fact that quantities of data, i.e., tracks, larger than the requested blocks are also cached in response to random requests thus requiring additional channel and director time means that the average input/output time of large blocks is greater than that of the noncached subsystem due to caching of data which is not in fact sequential. Hence, curve B shows that the average input/output time is higher than for the non-cached device of Curve A as the block size increases.

Curve C of FIG. 5 shows the improvement made in the preferred embodiment of the invention where a distinction is effectively drawn between data which is deemed likely to be sequential and that which is not. Since randomly accessed data, i.e., data not identified as being sequential, is not cached, this data has the same input/output access time as in the prior art as represented by curve A. The improvement made by caching sequential data shows up in that curve C is disposed beneath curve A until the block lengths get quite long, at which point, as noted above, latency is of less significance than the actual read/write time required. In such case further improvements can be made by caching multiple tracks.

FIG. 6 shows average input/output time as a function of the percentage of the data called for by the host which is sequential. Curve A again shows the performance of a non-cached disk system. No distinction is drawn there between sequential and randomly accessed data because multiple acquainted data areas reside on any given disk, and hence curve A is substantially flat. Curve B represents a cache system in which all data requests are cached. It shows a marked decrease of input/output time as the percentage of sequential data increases, i.e., as less random data is cached unnecessarily, i.e., the percentage of sequential data beneficially cached increases, performance is improved as reflected in the lowering of the input/output time. Curve C again shows the input/output time of a cache memory subsystem in which only data deemed likely to be sequential is cached. The performance improvement shown is attributable to the fact that the cache system is only used in the case of sequential data; director time is not consumed uselessly by caching random data.

In a presently preferred embodiment, the solid state array is of the form 72 bits wide by a variable depth "X", where "X" is determined by the number of storage cards installed and their state of population. Storage cards are 24 bits wide and therefore must be accessed in groups of three in order to attain the 72 bit array width stated previously. The storage is partitioned into 12 columns, i.e., 12 groups of 24–64K dynamic RAMs, and as such can be partially populated. The array controls handle all array accessing in an interleaved fashion such that at any given moment, every other array cycle is the refresh mode. All refresh controls are contained in the array controls and therefore appear transparent to the units requesting memory usage. The RAMs used are the 64K × 1-bit, 350 ns., 5 volt only type as readily available in the industry today. With the refresh scheme as implemented and the configuration and chip speeds indicated the array is capable of operation at a 6 megabyte data transfer rate. In the preferred embodiment, address checking is accomplished via parity with the last leg of this checking happening right at the storage cards. If an address parity check is detected at the storage cards this will result in the blocking of any write operations while this condition exists. This insures no breach of data integrity due to writing at an erroneous address and thereby overlaying good data which would invalidate the entire array.

It will be appreciated that there has been described a cache buffered memory subsystem which satisfies the needs of the art and objects of the invention listed above. Specifically, provision of the cache in the system such that it is operably connected to plural directors rather than being interposed between individual directors and control modules means that the advantages of the system are obtained without disadvantages caused by the "tying up" of the channels and directors unnecessarily. Stated somewhat differently, provision of the cache global to the directors means that plural directors can access any given control module such that even if a first director is staging data from one of a plurality of disk drives connected in a string to a control module to a cache, a second director can still access a different drive so that the system response time is minimally affected by the provision of the cache. Furthermore, provision in the preferred embodiment of means to determine which data is likely to be sequential permits the cache system only to be used where its use is likely to be beneficial, i.e., in those cases where the data is sequential and not randomly accessed.

Attached hereto as Appendix A and incorporated herein by reference is a document entitled "Chinook Functional Specification" dated Aug. 7, 1981. This document provides substantial additional disclosure describing a presently preferred embodiment of the invention, by which a cache buffered memory subsystem feature is added to a preexisting product of the assignee, the Storage Technology Corporation Model 8880 Disk Controller, referred to as the "Windom" controller. One skilled in the art provided with this document, the copending applications referred to above and incorporated by reference herein, and with prior art publications would have no difficulty in making and using the apparatus of the invention.

Those skilled in the art will additionally recognize that numerous improvements and modifications are possible to the system of the invention without departing from its essential spirit and scope. In particular, while the system of the invention has been largely described as a field installable improvement on existing disk subsystems, it will be appreciated that the invention has applicability to other forms of memory as well. In particular, there are environments in which tape drives can be beneficially connected to a cache memory subsystem of the invention. Furthermore, it should be realized as well that while the caching has been largely described as a means of staging data to a solid-state memory in anticipation of a read command from a host computer, the cache memory subsystem of the invention is envisioned as well to be useful in write operations whereby the host could write data directly to the cache and the cache would thereafter write it to a predetermined portion of a disk subsystem, so that the host would not have to experience seek and latency time delays prior to writing data directly to a disk as is now common in the prior art. Accordingly, the above description of the invention should not be construed as a limitation on its scope but as exemplary of a preferred embodiment thereof. The scope of the invention is measured more correctly by that of the following claims.

I claim:

1. A data storage system for use with a host computer, said computer comprising an arithmetic and logic unit and a main memory unit for containment of data to be processed and of programs to control said processing, said host computer being adapted to generate input/output commands directed to secondary data storage means connected to said host computer via channel means, said secondary data storage means comprising:
   one or more long-term magnetic data storage means;
   control module means for controlling said long-term data storage means;
   director means for controlling flow of data between said channel means, said control module means and said longterm data storage means in response to an input/output command; and
   solid-state cache memory means for containment of data anticipated to be the subject of a subsequent input/output command, said cache memory means being connected to said director means by first circuit means establishing a first data path from said long-term data storage means through said control module means and said director means into said cache, and by second circuit means establishing a second data path from said cache through said director means to said channel means.

2. The system of claim 1 wherein said cache memory means comprises an array of solid-state memory devices operatively connected to said director means for flow of data therebetween; and
   microprocessor means for controlling the locations within said array at which given data is stored upon receipt from said director means.

3. The system of claim 1 wherein plural director means are operatively connected to a single cache memory means.

4. The system of claim 1 wherein plural control module means are operatively connected to said director means.

5. The system of claim 1 wherein plural classes of long-term data storage means are provided, each said class being connected by unique control module means to said director means.

6. The system of claim 1 wherein said solid-state cache memory means comprises solid-state memory and controller circuitry, and software means, said memory and controller circuitry designed to be physically compatible with and adapted to be installable in a preexisting predetermined data storage system, and said software being supplementary and complementary to software comprised by said preexisting predetermined data storage system.

7. The system of claim 6 wherein said installation may be performed without modification to said control module means.

8. The system of claim 6 wherein said installation may be made without modification to said host computer or to said channel means.

9. The system of claim 6 wherein said controller circuitry and software means together comprise means for examination of data requested by said host to determine whether sequentially stored data records are likely to be accessed by said host, and means for utilizing said determination to control containment of data anticipated to be the subject of subsequent input/output commands in said cache memory means.

10. The system of claim 6 wherein said controller circuitry controls said cache memory means to contain data received from said host computer prior to writing said data from said cache onto said long-term data storage means.

11. In a data storage and processing system comprising a host computer comprising an arithmetic and logic unit and a main memory means, and a long-term data storage system, said long-term data storage system being operatively connected to said host by channel means for transfer of data and control information therebetween, said long-term data storage means being adapted to respond to input/output commands generated by said host computer by controllable juxtaposition of read/write head means with respect to recording media, said juxtaposition being performed under control of control module means selected to control the particular read/write head means and recording media selected, and director means adapted to interface said control module means to said channel means, the improvement which comprises: cache memory means of faster access speed than said long-term data storage means and cache memory controller means being operatively connected by circuit means to said director means, said cache memory means being controlled by said controller for containment of data, and said controller means being adapted to provide an indication that such containment would be effective in increasing overall efficiency of utilization of said host.

12. The system of claim 11 wherein said cache memory controller means providing the indication that said efficiency would be increased comprises microprocessor means controlling operation of said faster access cache memory means and of data paths traveled by data in its flow between said recording media and said host computer.

13. The system of claim 11 wherein said cache memory means and cache memory controller means is adapted to be incorporated in a data storage and processing system comprised of a host computer and of long-term storage media without modification to said host computer, its software, or to the channel means connecting said host to said long-term data storage means.

14. The system of claim 11 wherein said indication that containment of data in said cache memory means would be of utility in increasing the efficiency of operation of said host is provided by said cache memory controller means by examination of data previously having been called for by said host.

* * * * *

Notice of Adverse Decisions in Interference

In Interference No. 101,447, involving Patent No. 4,476,526, P. David Dodd, CACHE BUFFERED MEMORY SUBSYSTEM, final judgement adeverse to the patentee was rendered April 5, 1991, as to claims 1-3, 6, 8 and 10-14.

*(Official Gazette Oct. 22, 1991)*